UNITED STATES PATENT OFFICE.

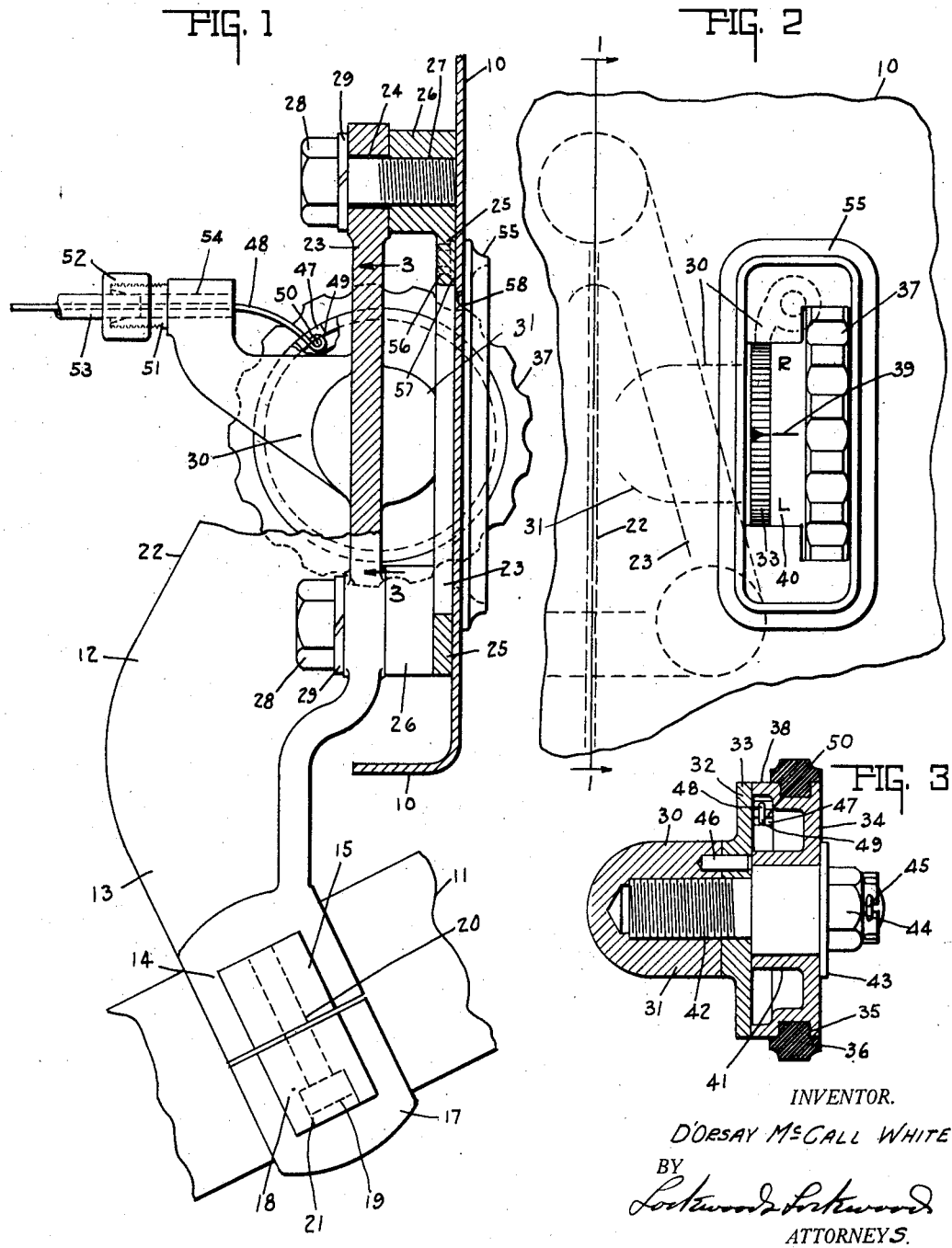

D'ORSAY McCALL WHITE, OF INDIANAPOLIS, INDIANA, ASSIGNOR TO LA FAYETTE MOTORS COMPANY, OF INDIANAPOLIS, INDIANA, A CORPORATION.

AUXILIARY AIR CONTROL.

1,391,032.  Specification of Letters Patent.  Patented Sept. 20, 1921.

Application filed February 24, 1920. Serial No. 360,897.

*To all whom it may concern:*

Be it known that I, D'ORSAY McCALL WHITE, a subject of the Kingdom of Great Britain, and a resident of Indianapolis, county of Marion, and State of Indiana, have invented a certain new and useful Auxiliary Air Control; and I do hereby declare that the following is a full, clear, and exact description thereof, reference being had to the accompanying drawings, in which like numerals refer to like parts.

The chief object of this invention is to provide an improved auxiliary air controlling mechanism for an internal combustion engine, and mount the same upon the instrument board of a motor vehicle containing said engine and adjacent the steering column of said motor vehicle.

Another object of the invention is to provide an improved supporting bracket for the controlling mechanism and the steering column so that said controlling mechanism and steering column will be adjacent each other, whereby the controlling mechanism will be readily accessible to the driver of the motor vehicle.

The full nature of the invention will be understood from the accompanying drawings and the following description and claims.

In the drawings Figure 1 is a side elevational view of the supporting bracket showing the same in position upon the instrument board of the motor vehicle and having parts broken away along the section line 1—1 of Fig. 2 to show other parts and the auxiliary controlling mechanism in detail. Fig. 2 is a front view of the exposed actuating portion of the auxiliary controlling mechanism, parts of the supporting bracket being shown by dotted lines. Fig. 3 is a central sectional view of the air controlling mechanism taken on the line 3—3 of Fig. 1.

In the drawings 10 indicates the instrument board of a motor vehicle, 11 the steering column thereof and 12 a supporting bracket suitably mounted upon the instrument board and having a depending projecting portion 13, having formed on the lower end thereof a clamping portion 14 provided with a securing socket portion 15. A suitable securing cap or clamp portion 17 is provided with a similarly formed socket portion 18. The end 14 and the cap 17, when in assembled relation, provide a bearing support for the steering column 11, said parts being secured together by means of the bolt 19 secured in the threaded openings 20, the cap portion having an enlarged slot 21 connecting therewith and adapted to seat the head of each bolt in the usual manner.

The bracket 12 is shown provided with a central reinforcing web 22 and a triangular plate portion 23, said web and plate portion continuing downwardly to form the depending lower portion 13 previously described. The corners of said triangular portions are herein shown provided with bolt openings 24. Positioned forwardly of said triangular portion of the bracket 12, and substantially parallel therewith is an open triangular spacing plate portion 25 spot welded to the instrument board, said plate portion at the corners thereof having spacing portions 26 herein shown formed integral therewith. Said spring plate is adapted to lie between said instrument board and the triangular portion 23 and space the latter from the board. The spacing lugs 26 are provided with threaded openings 27 which lie in registration with the openings 24 and are adapted to receive the threaded bolts 28, the same being spaced from said plate portion 23 by the lock washers 29.

Extending rearwardly from said plate portion is a bracket arm 30, said arm forming a bearing at its outer end, which will be presently described. Adjacent said bracket arm and herein shown integral with the bracket 12 is an outwardly extending bearing portion 31, said bearing portion as shown in Fig. 2 positioning the auxiliary air control mechanism to one side of said bracket plate 23 and said triangular spacing plate 25.

The auxiliary air controlling mechanism is shown comprising a stationary portion, in the form of a plate 32, said plate having a suitable graduated dial formed upon the circumferential edge 33. Adjacent said plate there is rotatably mounted a wheel member 34, said wheel member having an annular circumferential groove 35 formed therein, in which is seated a finger ring 36, said disk being provided with scallops 37 or other suitable finger gripping surfaces. As shown in Figs. 2 and 3 said disk does not extend over the entire circumferential area of said wheel, but leaves an exposed portion 38 upon which may be secured or etched a zero mark 39 and suitable indicating means 40, such as the letters R and L, said zero mark 39 coöperating with said scale or dial 33, the letters indicating the relative direction of rotation of said wheel. Said wheel is provided with a hub portion 41. A bolt member 42 has a threaded connection with the supporting portion 31 as shown in Fig. 3, and also extends through the stationary plate 33, said bolt upon its outer end carrying a washer 43 and nut 44 adjacent the face of the wheel 34. The nut and washer are secured upon said bolt by any suitable means, such as the cotter pin 45. It will be understood that in this manner the wheel 34 and finger disk or gripping disk 36 is rotatably mounted adjacent the plate 32, said plate being stationarily mounted by means of the pin 46 extending through the same into the supporting portion 31, as shown.

In the exposed portion of the circumference 38 of the wheel 34 there is provided a slot 47 through which extends an actuating rod member 48, said rod member extending within the interior of said wheel which, as shown in Fig. 3 is hollow. The wire 48 is provided at the inwardly extending end with an eye socket portion 49 through which extends a pin 50, said pin being securely seated in the wheel 34, as shown, and adjacent the exposed portion 38.

The bracket arm 30, as shown in Figs. 1 and 2 extends rearwardly and carries on its outer end a bearing which is substantially at right angles to the axis of said wheel. The exterior of the rearwardly extending portion 51 of said bearing is suitably threaded and adapted to receive a cap 52, said cap securing a conduit 53 to the rearwardly extending portion 51. The conduit tube 53 may be flexible, if desired, but is hollow and communicates with an opening 54 extending through said bearing portion 51. The wire 48, as shown in Fig. 1 extends into the opening 54 and through the conduit and is protected by the latter against accidental breakage. Upon the forward face of the instrument board 10 there is positioned a molding or plate 55, the same being secured to said instrument board by means of the bolts 56 and washers 57, said screw bolts extending through said instrument board and into said molding. As shown in Figs. 1 and 2 said molding substantially surrounds and protects the opening 58 in the instrument board through which the wheel 34 and stationary plate 33 slightly project and are exposed to be gripped.

From the foregoing it will be understood that as the gripping ring is actuated, the wheel 34 is rotated therewith and at the same time as said wheel rotates, the wire 48 is slid longitudinally of the conduit 53. In Fig. 1 the wheel is shown when the parts are in the closed position. When rotated the wire slides as descried and actuates mechanism connected therewith upon the other end, said mechanism being associated with an auxiliary air supply for the engine.

The invention claimed is:

1. An auxiliary air controlling mechanism including in combination an instrument board, a supporting bracket for said mechanism positioned upon said board and adjacent a slot therein, an annular actuating disk rotatably mounted upon said supporting bracket, said disk having a portion of its periphery extending forwardly through said slot exposed for actuation, and means associated with said rotatable disk and supported by said bracket for controlling the auxiliary air supply to an internal combustion engine or the like.

2. In a motor vehicle or the like the combination with an instrument board and steering column, of a bracket positioned upon said board and supporting said steering column, and an auxiliary air controlling mechanism supported by said bracket and projecting forwardly from said instrument board through a hole therein.

3. A supporting bracket for an auxiliary air controlling mechanism and steering column of a motor vehicle or the like comprising a triangular plate portion having the triangular corners thereof slotted for securing the same to the instrument board of the motor vehicle, said plate portion extending downwardly from the base of said triangular portion, a central rib positioned upon said triangular portion and extending downwardly, said rib and said downwardly extending portion being enlarged to form a steering column bearing, a cap positioned adjacent said bearing and adjustably secured thereto for inclosing said column between the bearing and the cap, and means upon said triangular portion for supporting the auxiliary air controlling mechanism adjacent said steering column.

4. An auxiliary air controlling mechanism including in combination an instrument board, a supporting bracket for said mechanism positioned upon said board and adjacent a slot therein, an annular rotatable actuating disk mounted upon said supporting bracket, said disk having a portion of its periphery extending forwardly through said slot exposed for actuation, and a wire extending through said supporting bracket and pivotally mounted near the periphery of said disk for controlling the auxiliary air supply to an internal combustion engine.

5. An auxiliary air controlling mechanism including in combination an instrument board, a supporting bracket for said mechanism positioned upon said board and adjacent a slot therein, an annular actuating disk rotatably mounted upon said supporting bracket, said disk having a portion of its periphery extending forwardly through said slot exposed for actuating, an indicating drum secured to said disk, a plate having graduation marks about its periphery mounted adjacent said drum for indicating the position of said disk, and means associated with said disk for controlling the auxiliary air supply to an internal combustion engine, or the like.

In witness whereof, I have hereunto affixed my signature.

D'ORSAY McCALL WHITE.